US012622422B2

(12) United States Patent
Ochiai

(10) Patent No.: US 12,622,422 B2
(45) Date of Patent: May 12, 2026

(54) SPINNING REEL FOR FISHING

(71) Applicant: Shimano Inc., Osaka (JP)

(72) Inventor: Koji Ochiai, Osaka (JP)

(73) Assignee: Shimano Inc., Osaka (JP)

( * ) Notice: Subject to any disclaimer, the term of this patent is extended or adjusted under 35 U.S.C. 154(b) by 92 days.

(21) Appl. No.: 18/628,481

(22) Filed: Apr. 5, 2024

(65) Prior Publication Data

US 2024/0407350 A1 Dec. 12, 2024

(30) Foreign Application Priority Data

Jun. 8, 2023 (JP) .................................. 2023-095076

(51) Int. Cl.
*A01K 89/01* (2006.01)
*A01K 89/033* (2006.01)
(52) U.S. Cl.
CPC .................................. *A01K 89/045* (2015.05)
(58) Field of Classification Search
CPC .......... A01K 89/011223; A01K 89/028; A01K 89/03
See application file for complete search history.

(56) References Cited

U.S. PATENT DOCUMENTS

| | | | | | |
|---|---|---|---|---|---|
| 4,911,378 | A | * | 3/1990 | Hitomi | A01K 89/027 242/246 |
| 2004/0227027 | A1 | * | 11/2004 | Ochiai | A01K 89/027 242/246 |
| 2008/0290202 | A1 | * | 11/2008 | Ochiai | A01K 89/0111 242/246 |
| 2017/0156300 | A1 | * | 6/2017 | Ochiai | A01K 89/027 |

FOREIGN PATENT DOCUMENTS

| | | | | |
|---|---|---|---|---|
| JP | H10136853 | A | * | 5/1998 |
| JP | 2021-122176 | A | | 8/2021 |

* cited by examiner

*Primary Examiner* — Emmanuel M Marcelo
(74) *Attorney, Agent, or Firm* — SPENCER FANE LLP

(57) ABSTRACT

A spinning reel for fishing includes a spool shaft movable in the reel body, a spool including a bobbin trunk onto which fishing line is capable of being wound and rotatably supported by the spool shaft, and a first drag mechanism having a first drag washer disposed in the forward direction forward of the bobbin trunk and configured to brake the rotation of the spool.

6 Claims, 5 Drawing Sheets

SPINNING REEL FOR FISHING

CROSS-REFERENCE TO RELATED APPLICATIONS

This application claims priority to Japanese Patent Application No. 2023-095076, filed on Jun. 8, 2023. The entire disclosure of Japanese Patent Application No. 2023-095076 are hereby incorporated by reference.

BACKGROUND

Technical Field

The present disclosure relates to a spinning reel for fishing.

Background Information

Conventional spinning reels for fishing can cast fishing line in a forward direction and are generally equipped a reel body, a spool shaft that is movable relative to the reel body, a spool with a bobbin trunk onto which fishing line can be wound and which is rotatably supported by the spool shaft, and a drag mechanism that is disposed within the bobbin trunk. See for example, see Japanese Patent Publication No. 2021-122176.

SUMMARY

It has been determined that in the spinning reel for fishing described in Japanese Patent Publication No. 2021-122176, when the drag washer of the drag mechanism is disposed inside the bobbin trunk, the drag washer becomes hot due to the heat generated by the drag operation, and there is the risk that the fishing line wound around the bobbin trunk will deteriorate due to the heat.

Further, in the case of the prior art, since the space inside the bobbin trunk is narrow, the outer diameter of the drag washer is restricted, resulting in increased surface pressure, which causes durability problems.

The present disclosure was made in consideration of these circumstances, and the object thereof is to provide a spinning reel for fishing which can prevent the deterioration of fishing line due to the heat generated during a drag operation and which can enhance the durability of the drag washer.

A first aspect of the spinning reel for fishing according to the present disclosure concerns a spinning reel for fishing that can cast (throw out) fishing line in a forward direction and that comprises a reel body, a spool shaft that is movable relative to the reel body, a spool rotatably supported by the spool shaft and with a bobbin trunk onto which fishing line can be wound, and a first drag mechanism, which has a first drag washer disposed forward of the bobbin trunk and which can brake the rotation of the spool.

According to the first aspect of the spinning reel for fishing of the present disclosure, the first drag mechanism with the first drag washer is disposed forward of the front end of the bobbin trunk of the spool, which enables the outer diameter of the first drag washer to be larger than in the case of the prior art, in which the drag mechanism is disposed inside the bobbin trunk. Therefore, the drag contact area of the first drag washer can be increased, and the surface pressure applied to the first drag washer can be minimized, thereby enhancing drag durability.

Further, in the present disclosure, by disposing the first drag mechanism at a position forward of and away from the bobbin trunk, it is possible to prevent the deterioration of the fishing line wound around the bobbin trunk due to the heat generated by the drag operation. Further, since the heat generated in the bobbin trunk due to a drag operation can be minimized in this way, the wall thickness of the bobbin trunk, which was increased in the prior art in consideration of the conducted heat, can be thinner, and, as a result, the weight of the spool can be reduced.

According to a second aspect of the present disclosure, in the spinning reel for fishing according to the first aspect, the first drag washer is preferably disposed on a front end surface of the bobbin trunk.

In this embodiment, since the first drag washer is disposed on the front end surface of the bobbin trunk, the heat generated by the drag operation is more easily dissipated and the deterioration of the fishing line can be reduced, compared to a case in which the drag washer is disposed in a space in which heat accumulates, such as inside the bobbin trunk.

Further, in the present disclosure, the first drag washer can be held by using the space forward of the bobbin trunk, so that, compared to a case in which the drag washer is placed inside the bobbin trunk, the holding structure of the first drag washer can be simplified and the weight of the spool can be reduced.

According to a third aspect of the present disclosure, in the spinning reel for fishing according to the first or second aspect, it is preferable to have a second drag mechanism with a second drag washer, which device is installed rearward of the bobbin trunk and brakes the rotation of the spool.

In this embodiment, the first drag mechanism and the second drag mechanism can be respectively positioned forward of and rearward of the bobbin trunk, so that the first drag washer and the second drag washer can each be of larger outer diameter. Therefore, the drag contact area of both the first and second drag washers can be increased, and the surface pressure applied to the first and second drag washers can be minimized, thereby enhancing drag durability.

According to a fourth aspect of the present disclosure, in the spinning reel for fishing according to the third aspect, a drag knob is included to adjust the pressing force on the first drag washer and/or the second drag washer.

In this embodiment, the drag knob can adjust the pressing force on the first drag washer and/or the second drag washer.

According to a fifth aspect of the present disclosure, in the spinning reel for fishing according to the third or fourth aspect, the drag knob can adjust the pressing force on the first drag washer and on the second drag washer at the same time.

In this embodiment, the drag knob can be used to adjust the pressing force on the first drag washer and on the second drag washer at the same time.

With the spinning reel for fishing according to the present disclosure, a long-term reduction in braking force can be minimized, and during reverse high-speed rotation, the rotor can be automatically braked.

BRIEF DESCRIPTION OF THE DRAWINGS

FIG. 1 is a longitudinal sectional view showing the configuration of a spinning reel for fishing according to a first embodiment of the present disclosure.

DETAILED DESCRIPTION OF EMBODIMENTS

Embodiments of the spinning reel for fishing will now be described with reference to the drawings. It should be noted that in each drawing the scale of each component can be changed as necessary in order to bring each component to a discernible size.

First Embodiment

Figure 1:
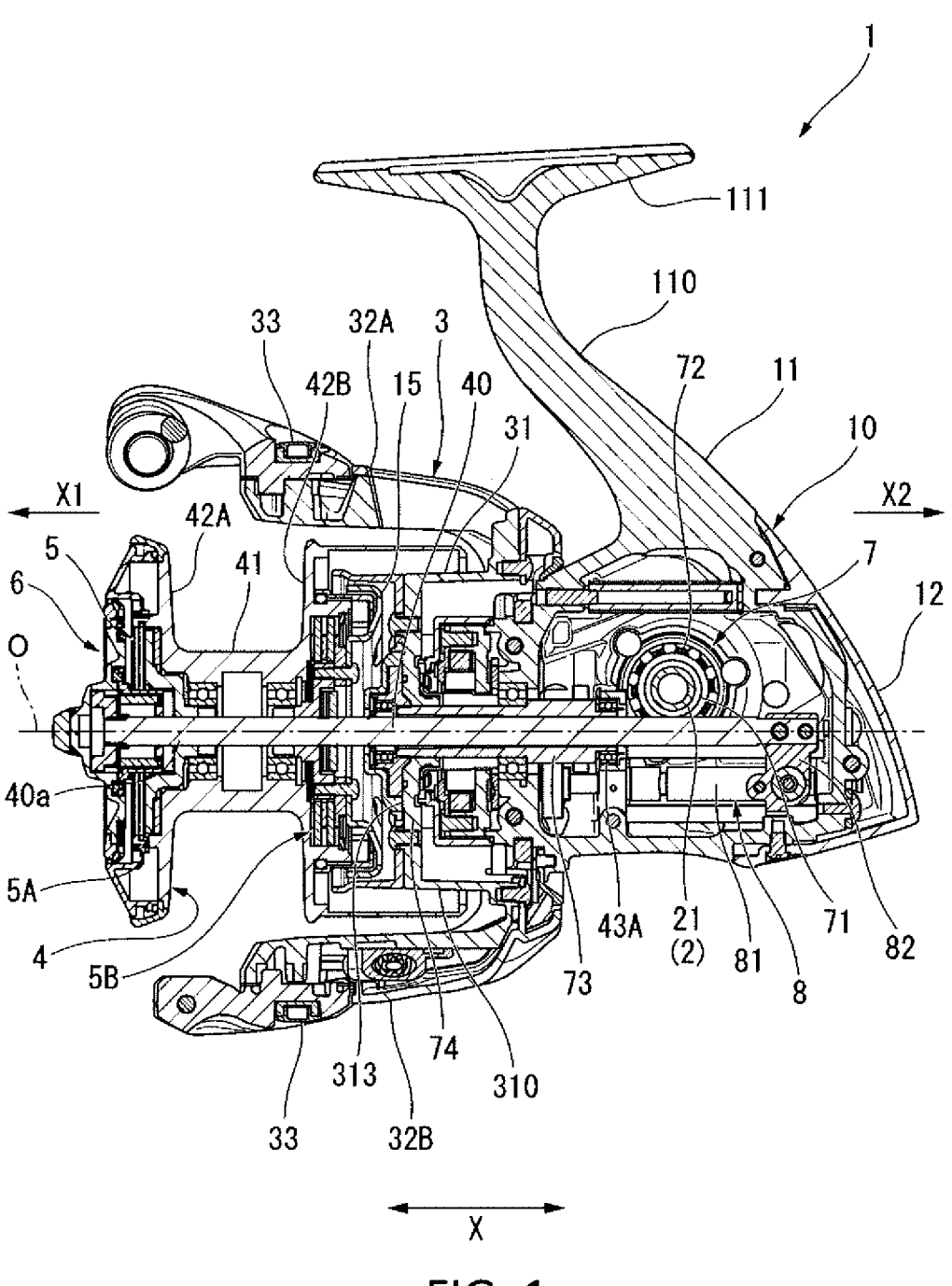
FIG. 1 is an example of the overall configuration of the fishing-related information processing system according to a first embodiment.

As shown in FIG. 1, the spinning reel for fishing 1 according to the present embodiment has a reel body 10 and is a reel that can cast (throw out) fishing line in a forward direction. The spinning reel for fishing 1 comprises a reel body 10, a handle 2 rotatably supported by the reel body 10, a rotor 3, a spool 4, a drag mechanism 5, and a drag adjustment mechanism 6.

In the following, the direction in which a spool shaft 40 (described below) of the spool 4 extends is defined as the axial direction X. The axial direction X also includes the direction along the spool shaft 40. Further, in the axial direction X, the direction in which the fishing line is cast is defined as the forward (front) direction X1, and the direction opposite to forward (front) X1 is defined as rearward (rear) direction X2. Further, in a plan view as seen from the axial direction X, a direction orthogonal to the axis of rotation O is defined as the radial direction, and a direction encircling axis of rotation O is defined as the circumferential direction.

The rotor 3 is rotatably supported at the front of the reel body 10. The spool 4 is capable of winding fishing line around its outer circumferential surface and is arranged at the front of the rotor 3 so as to be movable back and forth. The handle 2 can be attached to either the right or left side of the reel body 10 during use.

Handle

The handle 2 has a handle grip (not shown) and a handle arm (not shown) to the end of which the handle grip is rotatably attached. The base end of the handle arm is non-rotatably attached to a handle shaft 21 that extends in a direction intersecting the handle arm. The handle shaft 21 is integrally rotatably and detachably connected to a master gear shaft 71, described further below.

Reel Body

The reel body 10 has a reel body portion 11 with an interior space, and a cover member 12 that is detachably attached to the reel body portion 11 to close the space of the reel body portion 11.

The reel body portion 11 is integrally molded with a leg portion 110 extending upward and a T-shaped rod attachment portion 111 extending in the front and rear directions from the upper end of the leg 110.

The reel body portion 11 has an internal attachment space for the attachment of each mechanical part. A rotor drive mechanism 7 and an oscillating mechanism 8 include the attachment space of the reel body portion 11.

The cover member 12 covers the rear part of the reel body portion 11 and is attached to the reel body portion 11 at a plurality of locations.

The reel body portion 11 houses a bearing 43A through which the spool shaft 40 of the spool 4 passes from the forward direction X1 and which rotatably supports the rear end of the spool shaft 40. The reel body portion 11 and the cover member 12 each have a circular through-hole, not shown, through which the handle shaft 21 can be inserted. The handle shaft 21 is rotatably supported in the through-holes in the inner surface of the reel body portion 11 and the cover member 12.

The rotor drive mechanism 7 rotates the rotor 3 in conjunction with the handle 2. The oscillating mechanism 8 moves the spool 4 in reciprocating fashion via the spool shaft 40 in conjunction with the rotation of the handle 2.

The rotor drive mechanism 7 has a master gear shaft 71 to which the handle 2 is fixed for integral rotation therewith, a master gear 72 that rotates with the master gear shaft 71, and a pinion gear 73 that meshes with the master gear 72.

The master gear shaft 71 is integrally formed with the master gear 72 and is rotatably supported by the reel body portion 11. The pinion gear 73 is cylindrical in shape. The front part of the pinion gear 73 extends toward the spool 4 side at the forward direction X1 forward of the rotor 3. The front part of the pinion gear 73 is fixed by a nut 74 to the rotor 3 for integral rotation therewith. The pinion gear 73 is rotatably supported in the reel body portion 11 by bearings at the rear and middle portions, respectively.

The oscillating mechanism 8 is a traverse cam type. The oscillating mechanism 8 comprises a screw shaft 81 that is mounted in the reel body portion 11 so as to rotate about an axis parallel to the spool shaft 40 and a slider 82 that moves in reciprocating fashion due to the rotation of the screw shaft 81.

Rotor

The rotor 3 is rotatably supported by the reel body 10. The rotor 3 comprises a rotor body 31, a pair of bail arms 32A, 32B that are attached to the end of the rotor body 31 so as to be pivotable between the fishing line open position and the fishing line winding position, and a bail reversing mechanism 33 attached to the rotor body 31 to return the bail arms 32A, 32B from the fishing line open position to the fishing line winding position.

The rotor body 31 has a cylindrical portion 310 that is mounted in the reel body portion 11 so as to rotate about the spool shaft 40. The pair of bail arms 32A and 32B are disposed on the sides of the cylindrical portion 310 so as to oppose each other. The cylindrical portion 310 and bail arms 32A, 32B are made of an aluminum alloy, for example, and are integrally molded. A bail (not shown) in the form of a wire rod bent into a U-like shape for guiding the fishing line to the spool 4 is fixed between the ends of the opposing bail arms 32A, 32B.

A front wall 313 is formed at the front of the cylindrical portion 310. A through-hole through which the spool shaft 40 passes is formed in the center of a front wall 313.

Spool

Figure 2:
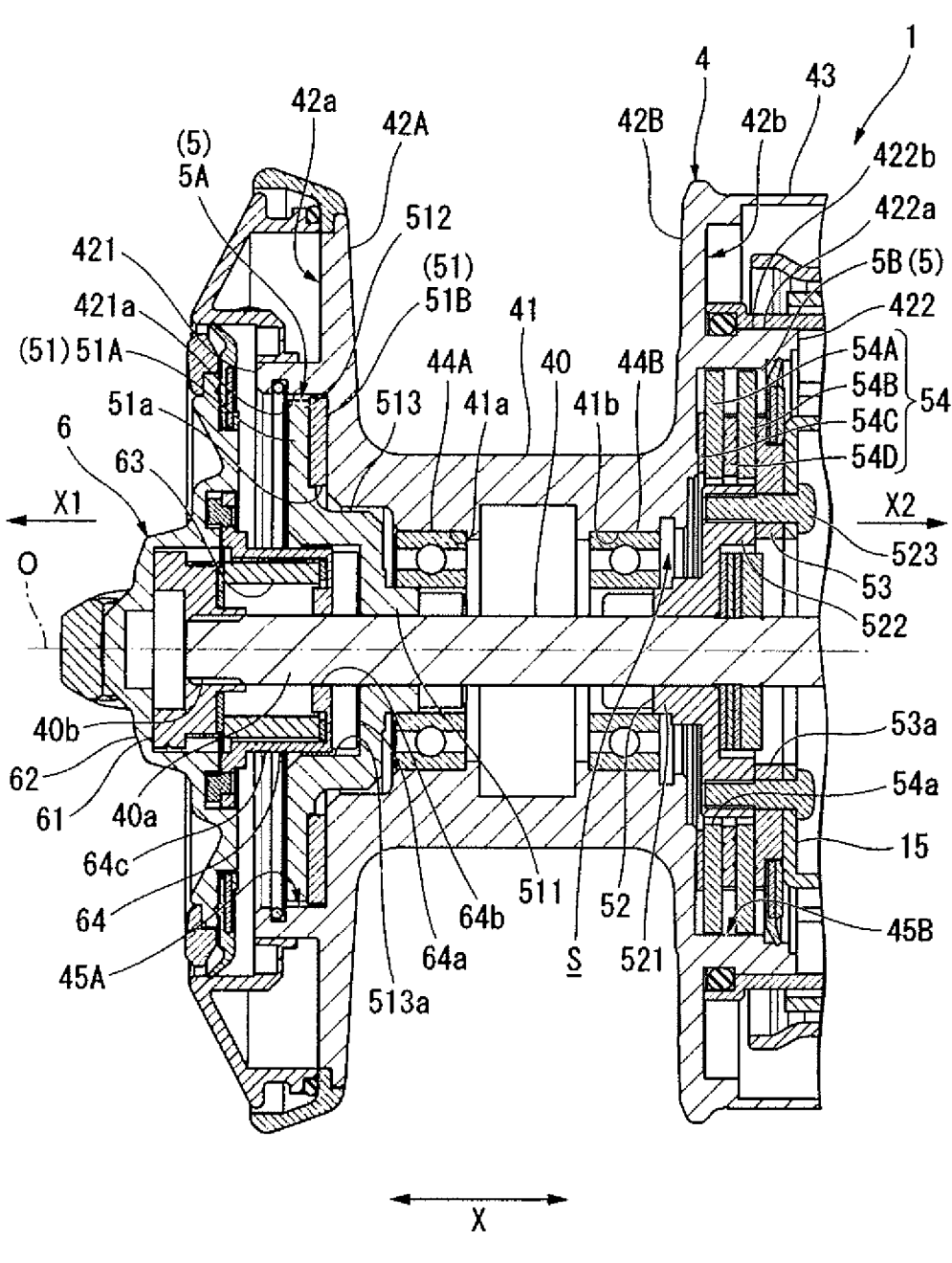
FIG. 2 is an enlarged sectional view showing the configuration of a drag mechanism of the spinning reel for fishing of FIG. 1.

FIG. 2 shows the spool 4 disposed between the pair of opposing bail arms 32A, 32B of the rotor 3 shown in FIG. 1 to move freely along the axial direction X (front-rear direction) at forward direction X1 forward of the rotor 3. The spool 4 is attached to the end of the spool shaft 40 via drag mechanisms 5A, 5B. The spool 4 moves in reciprocating fashion together with the spool shaft 40 along the axial direction X due to the oscillating mechanism 8 (see FIG. 1).

The spool 4 comprises a bobbin trunk 41 around which fishing line can be wound, a pair of flanges 42A, 42B integrally formed at the front and rear ends of the bobbin trunk 41, and a cylindrical skirt 43.

A fishing line is wound around the outer circumferential surface of the bobbin trunk 41. Inside the bobbin trunk 41, a first bearing 44A is disposed on the front inner surface 41*a*, and a second bearing 44B is disposed on the rear inner surface 41*b*. The first bearing 44A is disposed between the bobbin trunk 41 and a washer of a first drag mechanism 5A (described below). The second bearing 44B is disposed between the bobbin trunk 41 and a support part of a second drag mechanism 5B (described below). The bobbin trunk 41 is rotatably supported on parts of the drag mechanisms 5A, 5B via the first bearing 44A and the second bearing 44B, respectively. Here, since the washer of the first drag mechanism 5A and the support part of the second drag mechanism 5B non-rotatably engage the spool shaft 40, the bobbin trunk 41 is rotatably supported by the spool shaft 40 via the first bearing 44A and the second bearing 44B.

The pair of flanges 42A, 42B are disposed at the front and rear ends of the bobbin trunk 41 respectively. The pair of flanges 42A, 42B are each formed in an annular shape. Of the pair of flanges 42A, 42B, the front side is denoted as the front flange 42A, and the rear side is denoted as the rear flange 42B. The front flange 42A and the rear flange 42B are each integrally formed with the bobbin trunk 41.

A cylindrical front drag attachment part 421 is integrally formed on the front surface 42*a* of the front flange 42A. The front drag attachment part 421 is disposed in the radial center of the front flange 42A. The front flange 42A and the front drag attachment part 421 constitute a first housing recess 45A. The first housing recess 45A is open in the forward direction X1 and houses the first drag mechanism 5A.

A cylindrical rear drag attachment part 422 is integrally formed on a rear surface 42*b* of the rear flange 42B. The rear drag attachment part 422 is disposed inside the skirt 43, separately from the skirt 43. Male threads 422*b* are formed on the outer circumferential surface 422*a* of the rear drag attachment part 422. The rear flange 42B and the rear drag attachment part 422 constitute a second housing recess 45B. The second housing recess 45B is open in the rear direction X2 and houses the second drag mechanism 5B.

The skirt 43 is an integral part of the rear flange 42B and extends from the outer circumferential end of the rear flange 42B to the rear X2. The skirt 43 is formed in a cylindrical shape.

Spool Shaft

As shown in FIG. 1, the spool 4 is connected to front end 40*a* of the spool shaft 40 which is made from a stainless steel alloy, via the drag mechanisms 5A and 5B, and the slider 82 of the oscillating mechanism 8 is connected to the rear end. The spool shaft 40 is movable in the axial direction X (front-rear direction) with respect to the reel body 10 by the oscillating mechanism 8. Further, the spool shaft 40 can be moved with the spool 4 in the axial direction X by the drag mechanisms 5A and 5B. The spool shaft 40 passes through the inner circumferential surface of the pinion gear 73 and rotatably supports the spool 4 with a pair of first and second bearings 44A, 44B farther towards the outer circumference of the spool shaft 40 in the forward direction X1 than the cylindrical portion 310 of the rotor body 31. The front end 40*a* of the spool shaft 40 is essentially elliptical (non-circular) so as to have a non-circular external shape.

Drag Mechanism

As shown in FIG. 2, the drag mechanism 5 is used for braking the rotation of the spool 4. The drag mechanisms 5A and 5B are disposed in the forward direction X1 and the rearward direction X2 respectively forward of and rearward of the bobbin trunk 41 of the spool 4. That is, the first drag mechanism 5A is disposed in the forward direction X1 forward of the front flange 42A. The second drag mechanism 5B is disposed in the rearward direction X2 rearward of the rear flange 42B. The drag mechanism 5 has a first drag mechanism 5A, a second drag mechanism 5B, and a drag adjustment mechanism 6. The first drag mechanism 5A and the second drag mechanism 5B are non-rotatably mounted on the spool shaft 40.

First Drag Mechanism

The first drag mechanism 5A includes a plurality (here, two) of first drag washers 51 (51A, 51B) disposed in the forward direction X1 forward of the bobbin trunk 41. The first drag washers 51 are arranged on the front end surface of the bobbin trunk 41 (front surface 42*a* of the front flange 42A). The first drag washer 51 includes a stepped first drag washer 51A with a stepped shape located on the front side and a flat drag washer 51B. The first drag washer 51 generates a drag force by the relative rotation of the stepped drag washer 51A and the flat drag washer 51B.

The stepped drag washer 51A is mounted on the spool shaft 40 so as to be movable in the axial direction X together with the spool shaft 40. The stepped drag washer 51A has a cylindrical first bearing attachment portion 511, a friction portion 512 located forward of the outer circumferential side of the first bearing attachment portion 511, and a stepped portion 513 connecting the first bearing attachment portion 511 to the friction portion 512.

The first bearing attachment portion 511 is non-rotatably mounted on the spool shaft 40 and supports the inner race of the first bearing 44A. The cross-sectional shape of the first bearing attachment portion 511 has an essentially elliptical (non-circular) shape corresponding to the external shape of the front end 40*a* of the spool shaft 40. In the stepped drag washer 51A, the first bearing attachment portion 511 and the rear part of the stepped portion 513 are disposed inside the bobbin trunk 41, and the friction portion 512 and the front part of the stepped portion 513 are disposed in the forward direction X1 forward of the front flange 42A.

The stepped portion 513 extends radially outward from the front end of the first bearing attachment portion 511 and also bends toward the forward direction X1 to form a stepped shape. A housing recess 513*a*, which is open in the forward direction X1, is disposed inside the stepped portion 513. Part of the drag adjustment mechanism 6 is accommodated in this housing recess 513*a*.

The outer diameter of the stepped drag washer 51A is slightly smaller than the inner diameter of the front drag attachment part 421. That is, the stepped drag washer 51A has a larger outer diameter than the inner diameter of the bobbin trunk 41 of the spool 4, such that that the outer circumferential part of the friction portion 512 does not contact the inner surface 421*a* of the front drag attachment part 421. The friction portion 512 is arranged on the outer peripheral side of the first housing recess 45A formed in the forward direction X1 forward of the front flange 42A.

The flat drag washer 51B is held between the friction portion 512 of the stepped drag washer 51A and the front surface 42*a* of the front flange 42A. The flat drag washer 51B is disk-shaped and has a hole 51*a* at the center. The stepped portion 513 of the stepped drag washer 51A is inserted into this hole 51*a*.

Second Drag Mechanism

Figure 3:
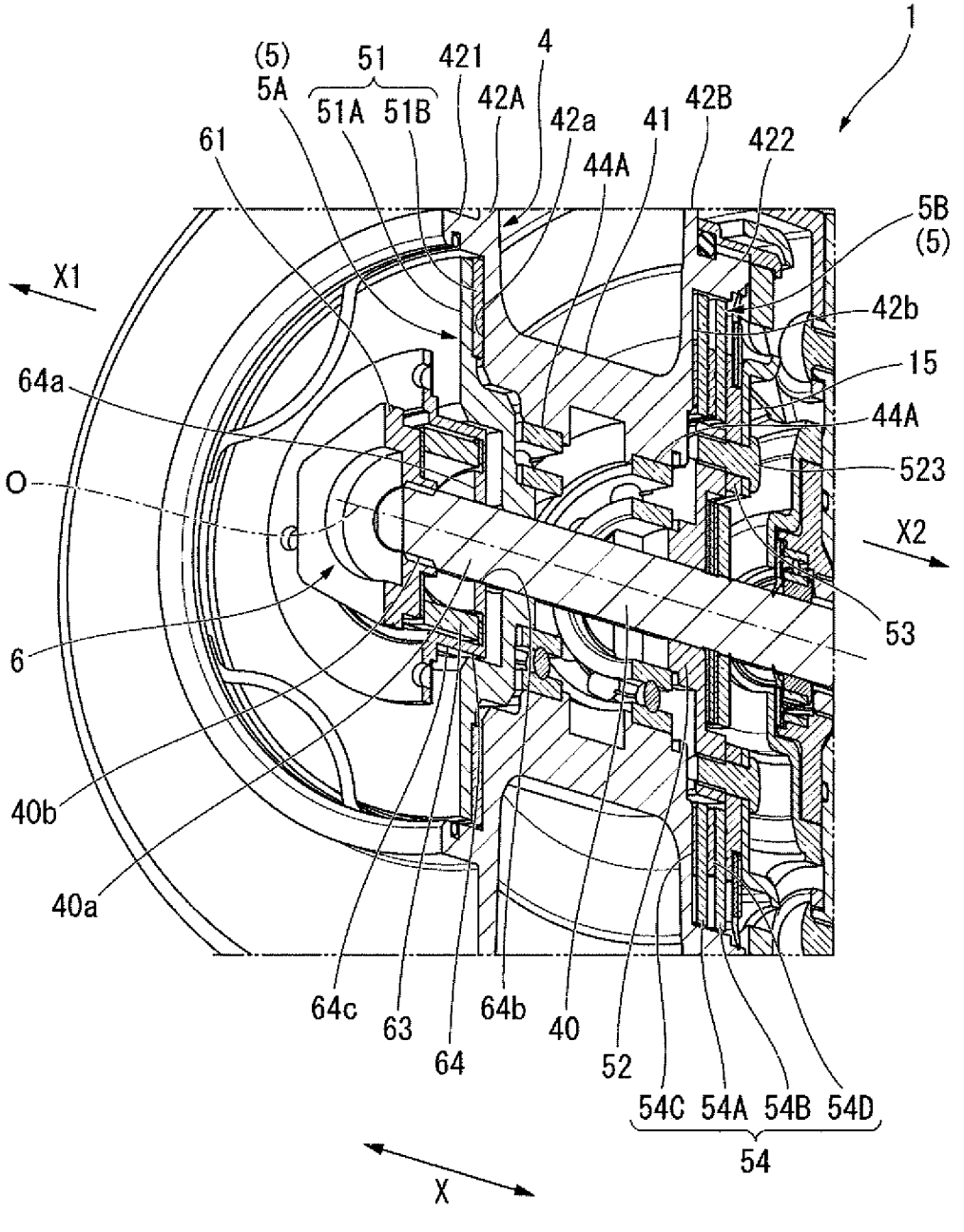
FIG. 3 is a partial cutaway perspective view showing the configuration of a first drag mechanism and a drag adjustment mechanism.

As shown in FIGS. 2 and 3, the second drag mechanism 5B has a support component 52, a regulating component 53, and a second drag washer 54. The support component 52 is attached to the spool shaft 40 so as to be movable in the axial direction X together with the spool shaft 40. The support component 52 includes a cylindrical second bearing attachment portion 521 and a regulating component attachment portion 522 located on the outer circumferential side of the second bearing attachment portion 521. The second bearing attachment portion 521 is non-rotatably mounted on the spool shaft 40 and supports the inner race of the second bearing 44B. The regulating component 53 is secured to the rear surface of the regulating component attachment portion 522 with a fixing bolt 523.

The regulating component 53 regulates the rotation of the support component 52 with respect to the spool shaft 40. The regulating component 53 is fixed to the rear surface of the regulating component attachment portion 522 of the support component 52 with the fixing bolt 523. The regulating component 53 is non-rotatably mounted on the spool shaft 40. The regulating component 53 is disk-shaped and has a hole 53a at the center. By non-circular engagement of the spool shaft 40 with the hole 53a, the regulating component 53 is fixed to the spool shaft 40 in non-rotatable fashion. The support component 52 non-rotatably engages the spool shaft 40 via the regulating component 53.

The regulating component 53 holds the friction portion (second drag washer 54 described further below) of the second drag mechanism 5B in the axial direction X between the regulating component and the rear surface 42b of the rear flange 42B. Specifically, the regulating component 53 is fixed to the support component 52 via a heat sink 15. This configuration limits the movement of the second drag washer 54 in the rearward direction X2.

A plurality of second drag washers 54 (here, four) are disposed in the rearward direction X2 rearward of the bobbin trunk 41. The second drag washers 54 are arranged on the rear end surface of the bobbin trunk 41 (rear surface 42b of the rear flange 42B). For the second drag washer 54, large-diameter flat drag washers 54A, 54B and small-diameter flat drag washers 54C, 54D are alternately arranged in the axial direction X from the front side to the rear side. These flat drag washers 54A, 54B, 54C and 54D are housed in the second housing recess 45B of the spool 4. The flat drag washers 54A, 54B, 54C, 54D are held between the regulating component 53 and the rear surface 42b of the rear flange 42B. The second drag washers 54 generate a drag force by the relative rotation among the flat drag washers 54A, 54B, 54C, and 54D.

The flat drag washers 54A, 54B, 54C, and 54D each are disk-shaped with a hole 54a at the center. The regulating component attachment portion 522 of the support component 52 is provided to the hole 54a using non-circular engagement. The flat drag washers 54A, 54B, 54C, and 54D are non-rotatably mounted on the support component 52. When the first drag washer 51 is pushed in the rearward direction X2, the second drag washer 54 is pushed in the axial direction X between the regulating component 53 and the spool 4.

Drag Adjustment Mechanism

As shown in FIGS. 2 and 3, the drag adjustment mechanism 6 is attached to the front end 40a of the spool shaft 40. The drag adjustment mechanism 6 comprises a nut member 61 that is screwed onto the male threads 40b at the front end 40a of the spool shaft 40, a drag knob 62 that is rotatably supported by the spool shaft 40 and fits into the nut member

61 in a manner preventing rotation and movement in the axial direction X, a coil spring 63 that applies a pressing force to the first drag washer 51 of the first drag mechanism 5A, and a pressing portion 64 that houses a coil spring 63.

The pressing portion 64 is a cylindrical member that has a bottom and that opens toward the forward direction X1. The rear portion of the pressing part 64 is accommodated in a housing recess 513a of the stepped drag washer 51A. The coil spring 63 is housed in the interior of the pressing portion 64. A through-hole 64b that passes through the front-rear direction is formed in a bottom part 64a of the pressing portion 64, and the front end 40a of the spool shaft 40 is inserted into the through-hole 64b. The inner peripheral surface of the through-hole 64b has an essentially elliptical (non-circular) cross-sectional shape corresponding to the external shape of the front end 40a of the spool shaft 40.

The inner and outer circumferential surfaces of cylindrical part 64c of the pressing portion 64 have an essentially circular shape. The pressing portion 64 can rotate relative to the drag knob 62 and move in the axial direction X relative to the drag knob.

The drag knob 62 is used to adjust the pressing force on the first drag washer 51 and on the second drag washer 54 at the same time. The drag knob 62 is non-rotatably fitted into the nut member 61 and is movable in the axial direction X together with the nut member 61. A finger rest (not shown) is formed on the front part of the drag knob 62 to be grasped by the fisherman. When the fisherman grasps the finger rest and rotates the drag knob 62, the nut member 61 rotates together with the drag knob 62, and the nut member 61 moves in the forward direction X1 or the rearward direction X2.

The coil spring 63 is disposed between the bottom part 64a of the pressing portion 64 and the nut member 61. The coil spring 63 is installed in the compressed state in the axial direction X. Therefore, the coil spring 63 continuously exerts a biasing force to move the pressing portion 64 in the rearward direction X2.

It should be noted that when the drag knob 62 is rotated and the nut member 61 is moved in the rearward direction X2, the biasing force exerted by the coil spring 63 (the pressing force applied to the pressing portion 64) increases.

On the other hand, when the drag knob 62 is rotated and the nut member 61 is moved in the forward direction X1, the biasing force exerted by the coil spring 63 (the pressing force applied to the pressing portion 64) decreases.

In the present embodiment, when the drag knob 62 is rotated and the biasing force of the coil spring 63 acts on the first drag washer 51 and the second drag washer 54 via the pressing portion 64, that is, the first drag washer 51 and the second drag washer 54 are pressed in the axial direction X, thereby generating a drag force (braking force), and a gap S is formed between the support component 52 and the rear surface 42b of the rear flange 42B of the spool 4. Therefore, the operation of rotating the drag knob 62 can cause the pressing portion 64 to move in the rearward direction X2 to apply a pressing force to the first and second drag mechanisms 5A, 5B by an amount equivalent to the size of the gap S. The size of the gap S corresponds to the range (predetermined range) of braking force that can be adjusted by the drag adjustment mechanism 6.

When the rotation of the drag knob 62 moves the pressing portion 64 in the rearward direction X2 and closes the gap S, the rear surface 42b of the rear flange 42B of the spool 4 contacts the support component 52 to regulate the movement of the pressing portion 64 in the rearward direction X2. This prevents the pressing force from being applied to the first and second drag mechanisms 5A, 5B even if the drag knob 62 is rotated further, and the generation of drag force beyond a predetermined range is limited. Thus, by adjusting the relative positional relationship (size of gap S) between the support component 52 and the rear surface 42*b* of the rear flange 42B, drag force within a predetermined range can be generated.

The operation of the spinning reel for fishing 1 configured as described above will now be explained in detail based on the drawings.

Figure 5:
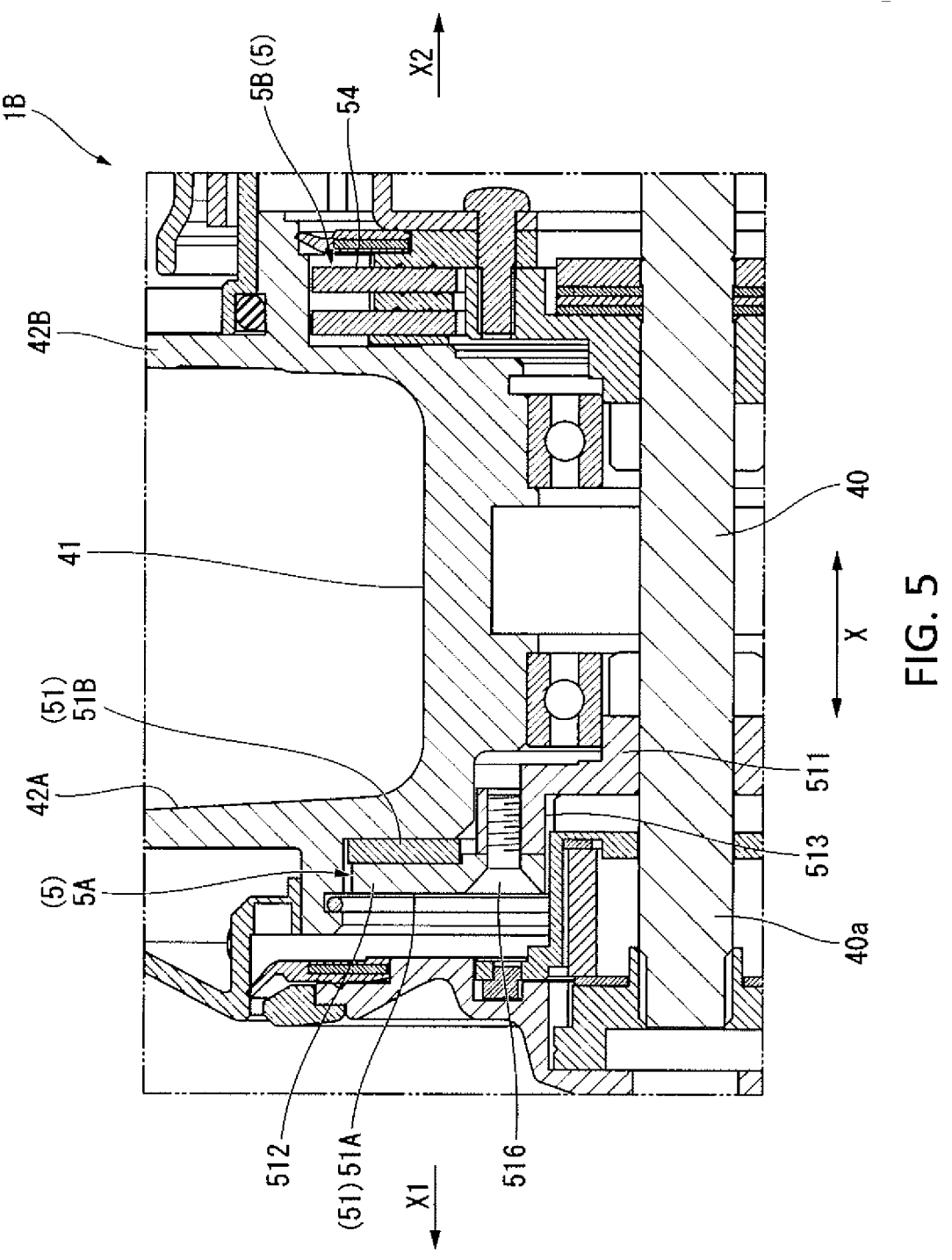
FIG. 5 is a sectional view showing the configuration of the drag mechanism of a spinning reel for fishing according to a modified example.

As shown in FIGS. 3 and 5, the spinning reel for fishing 1 according to the present embodiment is equipped with the spool shaft 40 that is movable in the reel body 10, the spool 4 with the bobbin trunk 41 onto which fishing line is wound and which spool is rotatably supported by the spool shaft 40, and the first drag mechanism 5A, which has a first drag washer 51 disposed in the forward direction X1 forward of the bobbin trunk 41 and which brakes the rotation of the spool 4.

By the above-described configuration, the first drag mechanism 5A having the first drag washer 51 is disposed in the forward direction X1 forward of the front end surface of the bobbin trunk 41 of the spool 4, which makes it possible for the outer diameter of the first drag washer 51 to be larger, compared to the conventional case in which the drag mechanism is disposed inside the bobbin trunk 41. Therefore, the drag contact area of the first drag washer 51 can be increased, and the surface pressure applied to the first drag washer 51 can be minimized, thereby enhancing drag durability.

Further, in the present embodiment, by disposing the first drag mechanism 5A in the forward direction X1 forward of the bobbin trunk 41, the deterioration of the fishing line wound around the bobbin trunk 41 due to the heat generated by the drag operation can be prevented. Further, since the heat generated in the bobbin trunk 41 due to the drag operation can be prevented, the wall thickness of the bobbin trunk 41, which was increased in the prior art in light of the conducted heat, can be thinner, resulting in a bobbin trunk 41 of decreased wall thickness; thus, the overall weight of the spool 4 can be reduced.

Further, in the present embodiment, since the first drag washer 51 is disposed on the front end surface of the bobbin trunk 41, the heat generated by the drag operation can be more easily dissipated, thereby reducing deterioration of the fishing line, compared to the case in which the drag washer is located in a space where heat accumulates, such as inside the bobbin trunk 41.

Further, in the present embodiment, since the first drag washer 51 can be held by utilizing the space in the forward direction X1 forward of the bobbin trunk 41, compared to the case in which the drag washer is located inside the bobbin trunk 41, the holding structure of the first drag washer 51 can be simplified, and the weight of the spool 4 can be reduced.

Further, the present embodiment includes a second drag mechanism 5B that has a second drag washer 54 disposed in the rearward direction X2 rearward of the bobbin trunk 41, and that brakes the rotation of the spool 4. Therefore, the first and second drag mechanisms 5A, 5B can be arranged in the forward direction X1 forward of the bobbin trunk 41 of the spool 4 and in the rearward direction X2 rearward of the bobbin trunk, respectively, so that first and second drag washers 51, 54 with larger outer diameters can be used. Therefore, the drag contact area of both the first and second drag washers 51, 54 can be increased, and the surface pressure applied to the first and second drag washers 51 and 54 can be minimized, thereby enhancing drag durability.

Further, the present embodiment includes a drag knob 62 to adjust the pressing force on the first drag washer 51 and/or the second drag washer 54 (first drag washer 51 in this embodiment). Thus, the pressing force for pressing the first drag washer 51 and/or the second drag washer 54 can be adjusted with the drag knob 62.

The spinning reel for fishing 1 according to the present embodiment with the above-described configuration can prevent the deterioration of fishing line due to the heat generated by the drag operation, thereby enhancing the durability of the drag washer.

Other embodiments of the spinning reel for fishing according to the present disclosure will now be described. Those components having the same functions as those of the first embodiment described above are indicated by the same reference numerals, and their detailed descriptions will not be repeated.

Second Embodiment

Figure 4:
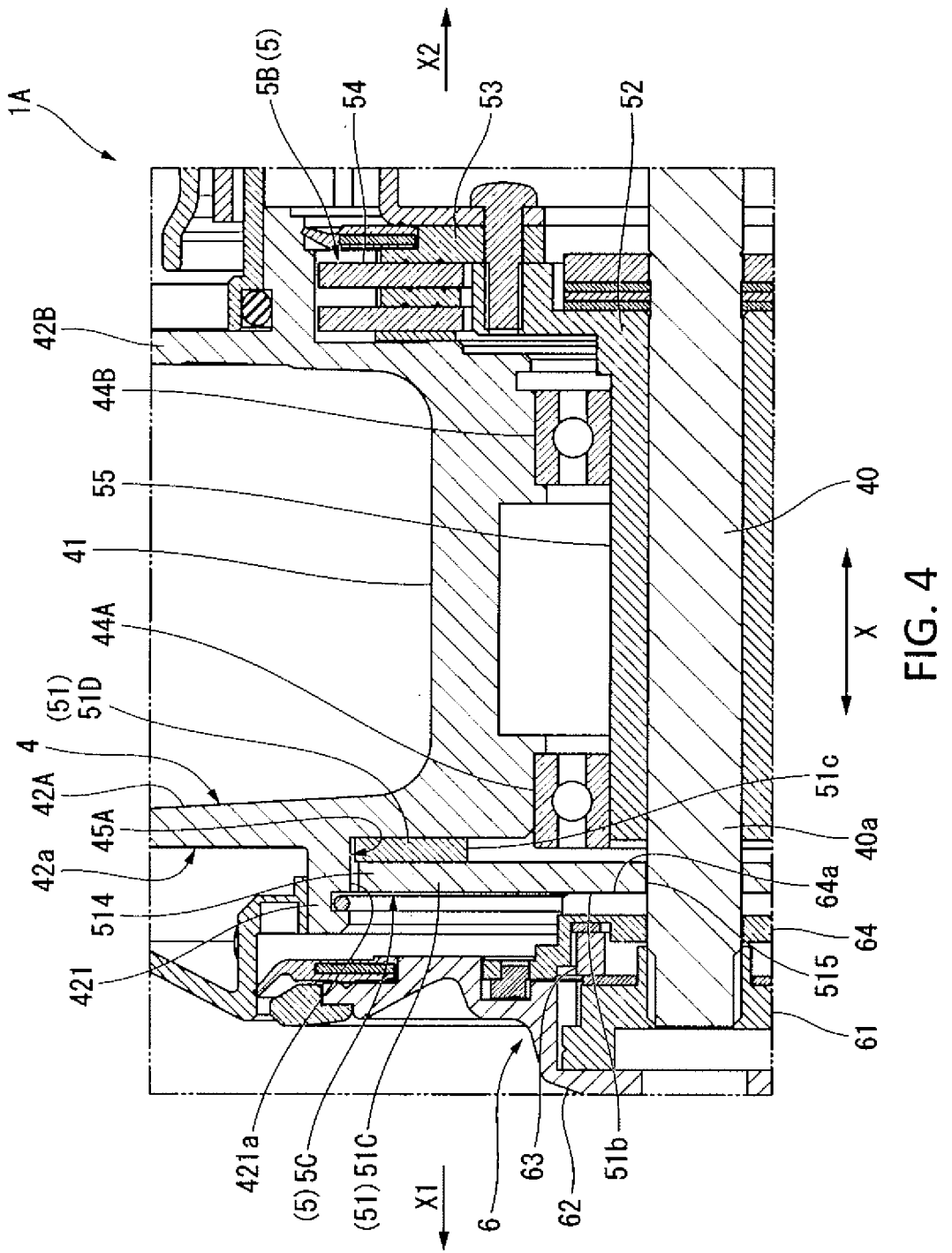
FIG. 4 is a sectional view showing the configuration of the drag mechanism of a spinning reel for fishing according to a second embodiment.

As shown in FIG. 4, the first drag mechanism 5C of the drag mechanism 5 in the spinning reel for fishing 1A according to a second embodiment has a plurality of (here, two) first drag washers 51 (51C, 51D) disposed in the forward direction X1 forward of the bobbin trunk 41. The first drag washers 51C and 51D are arranged on the front end surface of the bobbin trunk 41 (front surface 42*a* of front flange 42A). The first drag washers 51 include a first flat drag washer 51C located on the front side and a second flat drag washer 51D held between the first flat drag washer 51C and the front surface 42*a* of the front flange 42A. The first drag washer 51 generates drag force by means of the relative rotation between the first and second flat drag washers 51, 51D.

The first flat drag washer 51C is mounted on the spool shaft 40 so as to be movable in the axial direction X together with the spool shaft 40. The first flat drag washer 51C has a friction portion 514 on the outer circumferential side. The first flat drag washer 51C has an engagement portion 515 formed at the center, and the engagement portion 515 is non-rotatably mounted on the spool shaft 40. The cross-sectional shape of the engaging portion 515 is formed with an essentially elliptical (non-circular) cross-sectional shape, corresponding to the external shape of the front end 40*a* of the spool shaft 40. The bottom part 64*a* of the pressing portion 64 of the drag adjustment mechanism 6 comes in contact with the front surface 51*b* of the radially inner side of the first flat drag washer 51C from the forward direction X1. That is, in the second embodiment, the drag adjustment mechanism 6 is disposed in the forward direction X1 forward of the first drag washer 51.

The outer diameter of the first flat drag washer 51C is slightly smaller than the inner diameter of the front drag attachment portion 421. That is, the stepped drag washer 51C is set to have a larger diameter than the inner diameter of the bobbin trunk 41 of the spool 4, such that the outer circumference of the friction portion 514 does not contact the inner surface 421*a* of the front drag attachment portion 421. The friction portion 514 is disposed on the outer circumferential side of the first housing recess 45A formed in the forward direction X1 forward of the front flange 42A.

The second flat drag washer 51D is held between the friction portion 514 of the first flat drag washer 51C and the front surface 42*a* of the front flange 42A. The second flat drag washer 51D is disk-shaped with a hole 51*c* at the center. The spool shaft 40 is inserted into the hole 51*c*.

The second drag mechanism 5B of the second embodiment includes a cylindrical retaining member 55 that extends in the forward direction X1 from the support component 52 and is non-rotatably mounted on the spool shaft 40. The retaining member 55 is integral with the support component 52. The retaining member 55 supports the inner races of the first and second bearings 44A, 44B. Since the nut member 61 is fixed to the front end 40*a* of the spool shaft 40, the pressing force from rotation of the drag knob 62 acts on both the first drag washer 51 and the second drag washer 54 via the retaining member 55 and the support component 52, which are non-rotatably mounted on the spool shaft 40. In the second embodiment, the pressing force that acts on the first drag washer 51 and the second drag washer 54 at the same time can be adjusted by the drag knob 62.

Thus, in the second embodiment, as in the first embodiment, the first drag mechanism 5C with the first drag washers 51 (51C, 51D) is placed in the forward direction X1 forward of the front end surface of the bobbin trunk 41 of the spool 4, so that it possible to make the outer diameters of the first drag washers 51C, 51D larger than in the prior art, in which the drag mechanism is placed inside the bobbin trunk 41. Therefore, the drag contact area of the first drag washers 51C, 51D can be increased, and the surface pressure applied to the first drag washers 51C, 51D can be minimized, thereby enhancing drag durability.

Further, in this second embodiment, the first drag mechanism 5C is arranged in the forward direction X1 forward of the bobbin trunk 41, so that the deterioration of fishing line wound around the bobbin trunk 41 due to the heat generated by the drag operation can be minimized. Further, since the heat generated in the bobbin trunk 41 by the drag operation can also be minimized in this manner, the wall thickness of the bobbin trunk 41 can be reduced, thereby decreasing the weight of the spool 4.

Further, in the second embodiment, the first drag washers 51C, 51D are fully disposed in the forward direction X1 forward of the front flange 42A of the spool 4. That is, in this case, no parts of the first drag washers 51C, 51D are disposed inside the bobbin trunk 41 of the spool 4, and the internal space the bobbin trunk 41 can be increased. Therefore, the distance in the axial direction X between the first bearing 44A and the second bearing 44B, which are disposed inside the bobbin trunk 41, can be larger, and the diagonal play of the spool 4 can be prevented.

Embodiments of the spinning reel for fishing were described above; however, these embodiments were presented as examples and are not intended to limit the scope of the disclosure. The embodiments can be implemented in various other forms, and various omissions, substitutions, and modifications can be made insofar as they do not depart from the essence of the disclosure. Embodiments and variants thereof include, for example, those that can be readily envisaged by a person skilled in the art, those that are substantially identical, and those that are of equal scope.

For example, in the first embodiment described above, in the stepped drag washer 51A of the first drag mechanism 5A, the first bearing attachment portion 511, the friction portion 512, and the stepped portion 513 are integrally provided, but the present disclosure is not limited in this way. For example, in the spinning reel for fishing 1B according to the variant shown in FIG. 5, the friction portion 512 and the stepped portion 513 of the stepped drag washer 51A can be divided. In this embodiment, the first bearing attachment portion 511 and the stepped portion 513 are integrally provided, and the stepped portion 513 and the friction portion 512 are fixed together by a screw 516.

Further, the shape and size of the reel body 10, handle 2, rotor 3, and spool 4 can be changed as necessary.

What is claimed is:

1. A spinning reel for fishing that has a reel body and configured to cast fishing line in a forward direction, comprising:
    a spool shaft configured to be movable in the reel body;
    a spool having a bobbin trunk around which fishing line is capable of being wound and rotatably supported by the spool shaft; and
    a first drag mechanism having a first drag washer disposed forward of the bobbin trunk and configured to brake rotation of the spool, at least a portion of the first drag washer being disposed radially farther from the spool shaft than a surface of the bobbin trunk on which the fishing line is to be wound.

2. The spinning reel for fishing according to claim 1, wherein
    the first drag washer is disposed on a front end surface of the bobbin trunk.

3. The spinning reel for fishing according to claim 1, comprising
    a second drag mechanism that has a second drag washer disposed rearward of the bobbin trunk and configured to brake the rotation of the spool.

4. The spinning reel for fishing according to claim 3, further comprising
    a drag knob configured to adjust a pressing force on the first drag washer or the second drag washer.

5. The spinning reel for fishing according to claim 3, further comprising a drag knob configured to adjust a pressing force on the first drag washer and on the second drag washer at the same time.

6. The spinning reel for fishing according to claim 1, wherein the first drag washer is disposed so the at least a portion of the first drag washer is disposed radially farther from the spool than at least a portion of a flange of the bobbin trunk.

* * * * *